United States Patent
Lindholm (10) Patent No.: US 11,565,720 B2
(45) Date of Patent: Jan. 31, 2023

(54) AUTONOMOUS VEHICLE, SYSTEM, AND METHOD OF OPERATING AN AUTONOMOUS VEHICLE

(71) Applicant: Toyota Motor Engineering and Manufacturing North America, Inc., Plano, TX (US)

(72) Inventor: Trenton B. Lindholm, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 248 days.

(21) Appl. No.: 16/925,501

(22) Filed: Jul. 10, 2020

(65) Prior Publication Data
US 2022/0009520 A1    Jan. 13, 2022

(51) Int. Cl.
*B60W 60/00*    (2020.01)
*B60W 30/18*    (2012.01)
*B60W 30/095*    (2012.01)

(52) U.S. Cl.
CPC .... *B60W 60/0025* (2020.02); *B60W 30/0956* (2013.01); *B60W 30/18163* (2013.01);
(Continued)

(58) Field of Classification Search
CPC ........... B60W 30/095; B60W 30/0956; B60W 30/18163; B60W 50/0097; B60W 60/0025; B60W 60/0015; B60W 60/0027; B60W 2420/42; B60W 2420/52; B60W 2552/10; B60W 2552/00; B60W 2552/30; B60W 2554/80; B60W 2554/802; B60W 2554/801; B60W 2554/402; B60W 2554/4023; B60W 2554/4041; B60W 2710/20
See application file for complete search history.

(56) References Cited

U.S. PATENT DOCUMENTS 8,244,408 B2 *   8/2012   Lee ................... B60W 30/0956
                                                                        701/119
10,099,610 B2   10/2018   Schofield
(Continued)

FOREIGN PATENT DOCUMENTS

KR      1020180043144 A      4/2018

*Primary Examiner* — Russell Frejd
*Assistant Examiner* — Brandon Z Willis
(74) *Attorney, Agent, or Firm* — Jordan IP Law, LLC (57) ABSTRACT

Systems, methods, and computer program products to enhance the situational competency of a vehicle, when operating at least partially in an autonomous mode, and/or the safe operation of a vehicle, when operating at least partially in an autonomous mode. Such systems, methods, and computer program products are to facilitate operation of a vehicle, when operating at least partially in an autonomous mode, in a multi-lane roadway environment to coordinate a change of lane of the autonomous vehicle from a first lane in which the autonomous vehicle is currently operating and a target lane change area of a second lane. Such coordination is to dynamically take into consideration several operational safety factors within the driving environment, including the presence of one or more vehicles in a third lane adjacent to the target lane area of the second lane and the geometric roadway design.

14 Claims, 6 Drawing Sheets

(52) U.S. Cl.
CPC ..... *B60W 2420/42* (2013.01); *B60W 2420/52* (2013.01); *B60W 2420/54* (2013.01); *B60W 2552/00* (2020.02); *B60W 2554/402* (2020.02)

(56) References Cited

U.S. PATENT DOCUMENTS

| | | | |
|---|---|---|---|
| 10,259,416 B2* | 4/2019 | Takae | B60W 30/18163 |
| 11,046,310 B2* | 6/2021 | Yoo | B60W 10/04 |
| 2019/0035280 A1* | 1/2019 | Kim | G08G 1/167 |
| 2019/0382021 A1* | 12/2019 | Niibo | B60W 10/20 |
| 2021/0284162 A1* | 9/2021 | Parks | G05D 1/0212 |

\* cited by examiner

AUTONOMOUS VEHICLE, SYSTEM, AND METHOD OF OPERATING AN AUTONOMOUS VEHICLE

TECHNICAL FIELD

Embodiments relate generally to an autonomous vehicle, systems for implementation in an autonomous vehicle, a method of operating an autonomous vehicle, and a computer program product for operating an autonomous vehicle.

BACKGROUND

Automated and advanced driver assist systems (ADAS) in autonomous vehicles have lane change functionality in multi-lane roadway environments. Such systems coordinate a change of lane of an autonomous vehicle when an available lane change area is present.

BRIEF SUMMARY

One or more embodiments relate to systems, methods, and computer program products that are configured to enhance the situational competency of a vehicle, when operating at least partially in an autonomous mode, and/or the safe operation of a vehicle, when operating at least partially in an autonomous mode. Such systems, methods, and computer program products are to facilitate operation of a vehicle, when operating at least partially in an autonomous mode, in a multi-lane roadway environment to coordinate a change of lane of the vehicle from a first lane in which the vehicle is currently operating and a target lane change area of a second lane. Such coordination is to dynamically take into consideration one or more detected operational safety factors within the driving environment, including, but not limited to, the presence of one or more vehicles in a third lane adjacent to the target lane area of the second lane and the geometric roadway design.

Systems, methods, and computer program products to enhance the situational competency of a vehicle when operating at least partially in an autonomous mode and/or the safe operation of a vehicle when operating at least partially in an autonomous mode.

In accordance with one or more embodiments, systems, methods, and computer program products for implementation in a vehicle may coordinate and cause the vehicle, when operating at least partially in an autonomous mode, to conduct a lane change from a first lane in which the vehicle is presently operating and a second, targeted lane by dynamically conducting one or more actions, to include but is not limited to: detecting a presence of one or more vehicles in the targeted lane and a presence of one or more vehicles in a third lane adjacent to the targeted lane.

In accordance with one or more embodiments, the systems, methods, and computer program products for implementation in a vehicle when operating at least partially in an autonomous mode, may dynamically track the movement of the detected vehicle(s) in the targeted lane. Alternatively or additionally, the system may dynamically track the movement of the detected vehicle(s) in the third lane adjacent to the targeted lane.

In accordance with one or more embodiments, the systems, methods, and computer program products for implementation in a vehicle when operating at least partially in an autonomous mode, may classify the detected vehicle(s) in the targeted lane based on vehicle type. Alternatively or additionally, the system may classify the detection vehicle(s) in the third lane adjacent to the targeted lane based on vehicle type. The vehicle type may include, but is not limited to, cars, vans, trucks, motorcycles, buses, trailers, and semi-trailers.

In accordance with one or more embodiments, the systems, methods, and computer program products for implementation in a vehicle, when operating at least partially in an autonomous mode, may compare the classified detected vehicle type to an acceptable vehicle type. The acceptable vehicle type may be customized by a user to permit a lane change only for pre-selected vehicles. As an example, a delay in executing the lane change may occur until an acceptable space or area in the targeted lane becomes available.

In accordance with one or more embodiments, the systems, methods, and computer program products for implementation in a vehicle, when operating at least partially in an autonomous mode, may cause, in response to the comparison, implementation of a driving maneuver in which the autonomous vehicle changes from the first lane to the targeted lane. The autonomous vehicle may perform such a driving maneuver to the targeted lane upon a lapse of a predetermined time from the comparison.

In accordance with one or more embodiments, systems, methods, and computer program products for implementation in a vehicle, when operating at least partially in an autonomous mode, may coordinate and cause the autonomous vehicle to conduct a lane change from a first lane in which the autonomous vehicle is presently operating and a second, targeted lane by dynamically conducting one or more actions, to include but is not limited to: detecting a presence of one or more vehicles in the targeted lane and detecting a geometric roadway design upon which the autonomous vehicle traveling. As described herein, "geometric roadway design" means the three-dimensional layout of the roadway. The geometric road design may include horizontal alignment (e.g., curves and tangents), vertical alignment (e.g., vertical curves and grades), and cross-section (e.g., lanes and shoulders, curbs, medians, roadside slopes and ditches, and sidewalks).

In accordance with one or more embodiments, the systems, methods, and computer program products for implementation in a vehicle, when operating at least partially in an autonomous mode, may classify the detected geometric roadway design.

In accordance with one or more embodiments, the systems, methods, and computer program products for implementation in a vehicle, when operating at least partially in an autonomous mode, may compare the classified road geometry to an acceptable geometric roadway design. The acceptable geometric roadway design may be customized by a user to permit a lane change only for pre-selected geometric roadway designs. As an example, a delay in executing the lane change may occur until an acceptable geometric roadway design of the targeted lane becomes available.

In accordance with one or more embodiments, the systems, methods, and computer program products for implementation in a vehicle, when operating at least partially in an autonomous mode, may cause, in response to the comparison, a driving maneuver in which the autonomous vehicle changes from the first lane to the targeted lane. The autonomous vehicle may perform such a driving maneuver to the targeted lane upon a lapse of a predetermined time from the comparison.

One or more embodiments may include a system for operating a vehicle, when operating at least partially in an autonomous mode, to change from a first lane to a second lane adjacent to the first lane, the system comprising one or more of: a sensor system to dynamically detect a driving environment located externally to the autonomous vehicle which includes a presence of a vehicle in a third lane adjacent to the second lane; and one or more processors, operatively coupled to the sensor system, to execute a set of instructions that cause the one or more processors to: identify a target lane change area in the second lane, determine the location of the detected vehicle relative to the identified target lane change area, and cause, responsive to a determination that the detected vehicle is not within a predetermined threshold distance relative of the identified target lane change area, implementation of a driving maneuver by the autonomous vehicle from the first lane to the identified target lane change area.

One or more embodiments may include a method of operating a vehicle, when operating at least partially in an autonomous mode, to change from a first lane to a second lane adjacent to the first lane, the method comprising one or more of: dynamically detecting a driving environment, located externally to the autonomous vehicle, which includes a presence of a vehicle in a third lane adjacent to the second lane; identifying a target lane change area in the second lane; determining the location of the detected vehicle relative to identified target lane change area; and causing, responsive to a determination that the detected vehicle is not within a predetermined threshold distance relative of the identified target lane change area, implementation of a driving maneuver by the autonomous vehicle from the first lane to identified target lane change area.

One or more embodiments may include a computer program product for operating a vehicle, when operating at least partially in an autonomous mode, to change from a first lane to a second lane adjacent to the first lane, the computer program product including at least one computer readable medium, comprising a set of instructions, which when executed by one or more processors, cause the one or more processors to one or more of: identify a target lane change area in the second lane; determine the location of the detected vehicle relative to identified target lane change area; and cause, responsive to a determination that the detected vehicle is not within a predetermined threshold distance relative of the identified target lane change area, implementation of a driving maneuver by the autonomous vehicle from the first lane to the identified target lane change area.

One or more embodiments may include a system, a method, and a computer program product for operating a vehicle, when operating at least partially in an autonomous mode, to change from a first lane to a second lane adjacent to the first lane, and comprises one or more of: a sensor system to detect a driving environment, located externally to the autonomous vehicle, which includes a presence of one or more vehicles in the second lane and a geometric roadway design at least up to a distance where the lane change may be completed; one or more processors, operatively coupled to the sensor system, to execute a set of instructions that cause the one or more processors to: identify a target lane change area in the second lane, determine, based on the detected geometric roadway design, if the detected geometric roadway design at the identified target lane change area is curved, determine, responsive to a determination that the detected geometric roadway design at the identified target lane change area is curved, the gravitational force ($F_d$) required to implement a lane change to the identified target lane change area, compare the determined gravitational force ($F_d$) to a predetermined acceptable or threshold gravitational force value ($F_a$), cause, in response to a comparison in which the determined gravitational force ($F_d$) is less than or equal to the predetermined acceptable or threshold gravitational force value ($F_a$), implementation of a driving maneuver by the autonomous vehicle from the first lane to the identified target lane area. Should the determined gravitational force ($F_d$) be greater than the predetermined acceptable or threshold gravitational force value ($F_a$), delay the implementation of a driving maneuver by the autonomous vehicle at least until a lane change may be implemented. Alternatively or additionally, should the determined gravitational force ($F_d$) be greater than the predetermined acceptable or threshold gravitational force value ($F_a$), the process returns to start whereby a new or alternative target lane change area is identified.

One or more embodiments may include a system, a method, and a computer program product for operating a vehicle, when operating at least partially in an autonomous mode, to change from a first lane to a second lane adjacent to the first lane, and comprises one or more of: a sensor system to dynamically detect a presence of a second vehicle in a third lane adjacent to the second lane, a third vehicle in the third lane that is spatially ahead of the second vehicle, and a geometric roadway design at least up to a distance where a lane change may be completed; and one or more processors, operatively coupled to the sensor system, to execute a set of instructions that cause the one or more processors to: identify a target lane change area in the second lane; dynamically track the movement of the detected second vehicle and the detected third vehicle; determine the location of at least the detected second vehicle relative to the identified target lane change area; determine a spatial distance between the detected second vehicle and the detected third vehicle, and/or the rate of speed/acceleration of the detected second vehicle; determine or predict, responsive to the detected geometric roadway design, the determination of the spatial distance, and the determination of the rate of the speed/acceleration of the detected second vehicle, the probability of the detected second vehicle implementing a lane change to the second lane; and cause, in response to the determination or prediction, implementation of a driving maneuver by the autonomous vehicle from the first lane to the target lane change area.

In accordance with one or more embodiments, the set of instructions cause the one or more processors to delay, responsive to a determination that the detected vehicle is within the predetermined threshold distance to the identified target lane change area, implementation of the lane change by the autonomous vehicle until the detected vehicle is not within the predetermined threshold distance to the identified target lane change area.

In accordance with one or more embodiments, the set of instructions cause the one or more processors to classify, responsive to a determination that the detected vehicle is within the predetermined threshold distance to the identified target lane change area, the detected vehicle based on vehicle type.

In accordance with one or more embodiments, the set of instructions cause the one or more processors to compare the classified detected vehicle type to a predetermined acceptable vehicle type.

In accordance with one or more embodiments, the set of instructions cause the one or more processors to cause, responsive to determination that the vehicle type is acceptable based on the comparison, implementation of a driving maneuver by the autonomous vehicle from the first lane to the target lane area.

In accordance with one or more embodiments, detecting the driving environment comprises detecting a geometric roadway design at least up to a distance where a lane change may be completed.

In accordance with one or more embodiments, detecting the driving environment comprises detecting a presence of a second vehicle in the third lane that is spatially ahead of the detected vehicle.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
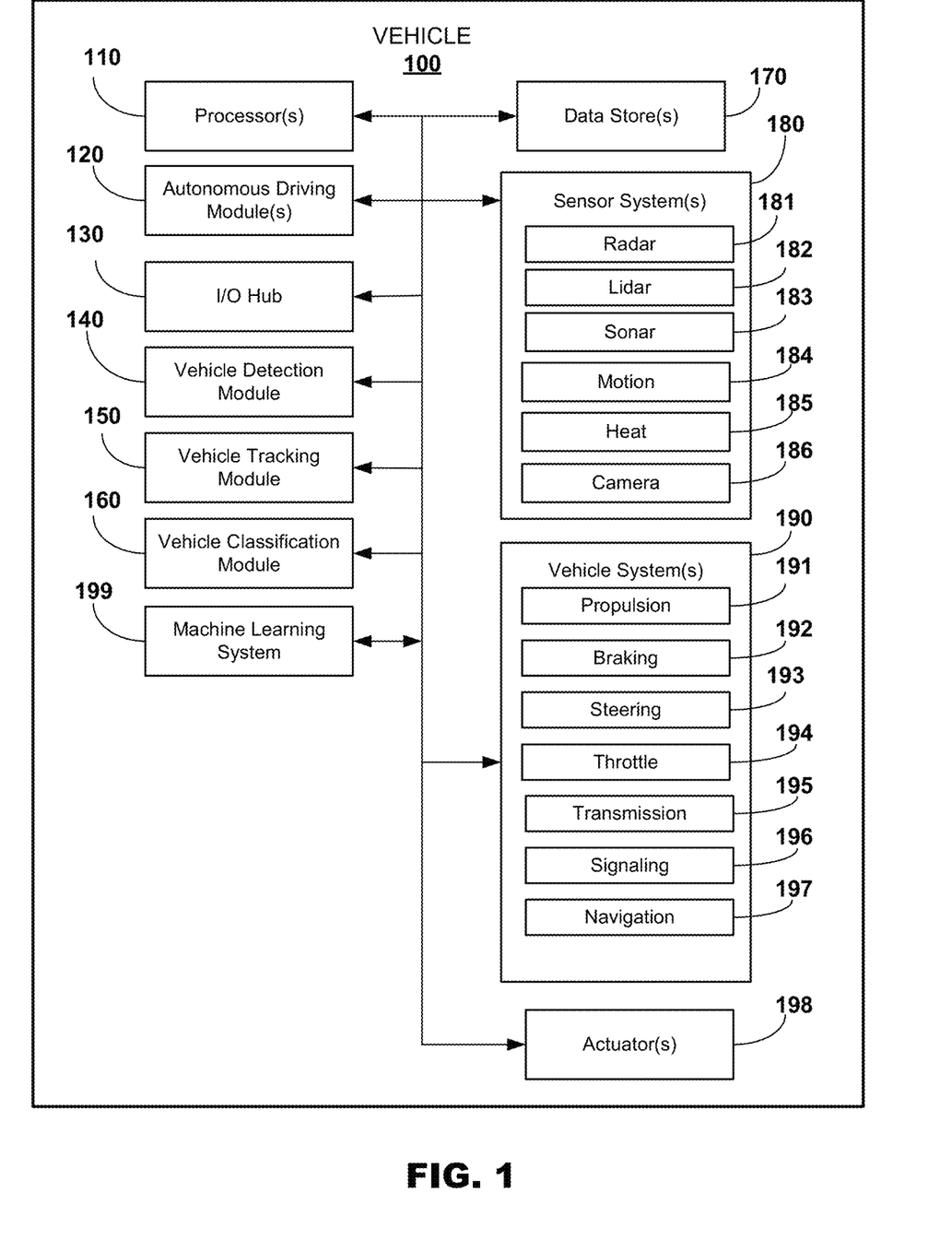
FIG. 1 illustrates an example of the autonomous vehicle, in accordance with one or more embodiments.

Turning to the figures, in which FIG. 1 illustrates a vehicle 100, in accordance with one or more embodiments. In accordance with one or more embodiments, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, or any other form of motorized transport.

In accordance with one or more embodiments, the vehicle 100 may comprise an autonomous vehicle. As described herein, an "autonomous vehicle" may comprise a vehicle that is configured to operate in an autonomous mode. As set forth, described, and/or illustrated herein, "autonomous mode" means that one or more computing systems are used to operate, and/or navigate, and/or maneuver the vehicle along a travel route with minimal or no input from a human driver. In accordance with one or more embodiments, the vehicle 100 may be configured to be selectively switched between an autonomous mode and a manual mode. Such switching may be implemented in any suitable manner (now known or later developed). As set forth, described, and/or illustrated herein, "manual mode" means that operation, and/or navigation, and/or maneuvering of the vehicle along a travel route, may, either in whole or in part, is to be performed by a human driver.

In accordance with one or more embodiments, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In accordance with one or more embodiments, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

In accordance with one or more embodiments, the vehicle 100 comprises one or more processors 110. As set forth, described, and/or illustrated herein, "processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 may comprise at least one hardware circuit (e.g., an integrated circuit) configured to carry out instructions contained in program code. In embodiments in which there is a plurality of processors 110, such processors 110 may work independently from each other, or one or more processors may work in combination with each other. In accordance with one or more embodiments, the processor 110 may be a host, main, or primary processor of the vehicle 100. For instance, the processor 110 may comprise an engine control unit (ECU).

In accordance with one or more embodiments, the vehicle 100 may comprise one or more autonomous driving modules 120. The autonomous driving module 120 may be implemented as computer readable program code that, when executed by a processor, implement one or more of the various processes described herein, including, for example, determining a current driving maneuvers for the vehicle 100, future driving maneuvers and/or modifications. The autonomous driving module 120 may also cause, directly or indirectly, such driving maneuvers or modifications thereto to be implemented. The autonomous driving module 120 may be a component of one or more of the processors 110. Alternatively, the autonomous driving module 120 may be executed on and/or distributed among other processing systems to which the processor 110 is operatively connected. The autonomous driving module 120 may include instructions (e.g., program logic) executable by the processor 110. Such instructions may comprise instructions to execute various vehicle functions and/or to transmit data to, receive data from, interact with, and/or control the vehicle 100 or one or more systems thereof (e.g. one or more of vehicle systems 190). Alternatively or additionally, the data store(s) 170 may contain such instructions.

In accordance with one or more embodiments, the vehicle 100 may comprise an I/O hub 130 operatively connected to other systems of the vehicle 100. The I/O system 130 may comprise an input interface and an output interface. The input interface and the output interface may be integrated as a single, unitary interface, or alternatively, be separate as independent interfaces that are operatively connected.

The input interface is defined herein as any device, component, system, element, or arrangement or groups thereof that enable information/data to be entered in a machine. The input interface may receive an input from a vehicle occupant (e.g. a driver or a passenger) or a remote operator of the vehicle 100. In an example, the input interface may comprise a user interface (UI), graphical user interface (GUI) such as, for example, a display, human-machine interface (HMI), or the like. Embodiments, however, are not limited thereto, and thus, the input interface may comprise a keypad, touch screen, multi-touch screen, button, joystick, mouse, trackball, microphone and/or combinations thereof.

The output interface is defined herein as any device, component, system, element or arrangement or groups thereof that enable information/data to be presented to a vehicle occupant and/or remote operator of the vehicle 100. The output interface may be configured to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

In accordance with one or more embodiments, the vehicle 100 may comprise one or more data store(s) 170 to for storing one or more types of data. The vehicle 100 may include interfaces that enable one or more systems thereof to manage, retrieve, modify, add, or delete, the data stored in the data store(s) 170. The data store(s) 170 may comprise volatile and/or non-volatile memory. Examples of suitable data store(s) 170 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 170 may be a component of the processor 110, or alternatively, may be operatively connected to the processor 110 for use thereby. As set forth, described, and/or illustrated herein, "operatively connected" may include direct or indirect connections, including connections without direct physical contact.

In accordance with one or more embodiments, the vehicle 100 may comprise a sensor system 180 configured to, at least during operation of the vehicle 100, dynamically detect, determine, assess, monitor, measure, quantify, and/or sense information about the vehicle 100 and the driving environment external to the vehicle 100. As set forth, described, and/or illustrated herein, "sensor" means any device, component and/or system that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

Alternatively or additionally, the sensor system 180 may comprise one or more sensors including radar sensors 181, lidar sensors 182, sonar sensors 183, motion sensors 184, heat sensors 185, and cameras 186. The one or more sensors 181-186 may be configured to detect, determine, assess, monitor, measure, quantify, and/or sense information about the external environment in which the vehicle 100 is located, including information about other vehicles in the external environment. Alternatively or additionally, the sensor system 180 may be configured to detect, determine, assess, monitor, measure, quantify, and/or sense the location of the vehicle 100 and/or the location of vehicles in the environment relative to the vehicle 100. Various examples of these and other types of sensors will be described herein. It will be understood that the embodiments are not limited to the particular sensors described herein.

The sensor system 180 and/or the one or more sensors 181-186 may be operatively connected to the processor 110, the data store(s) 170, the autonomous driving module 120 and/or other elements, components, modules of the vehicle 100. The sensor system 180 and/or any of the one or more sensors described herein may be provided or otherwise positioned in any suitable location with respect to the vehicle 100. For example, one or more sensors may be located within the vehicle 100, one or more sensors may be located on the exterior of the vehicle 100, one or more sensors may be located to be exposed to the exterior of the vehicle 100, and/or one or more sensors may be located within a component of the vehicle 100. The one or more sensors may be provided or otherwise positioned in any suitable that permits practice of the one or more embodiments.

In accordance with one or more embodiments, the one or more sensors 181-186 may work independently from each other, or alternatively, may work in combination with each other. The sensors 181-186 may be used in any combination, and may be used redundantly to validate and improve the accuracy of the detection.

The sensor system 180 may comprise any suitable type of sensor. For example, the sensor system 180 may comprise one or more sensors (e.g., speedometers) configured to detect, determine, assess, monitor, measure, quantify, and/or the speed of the vehicle 100 and other vehicles in the external environment. The sensor system 180 may also comprise one or more environment sensors configured to detect, determine, assess, monitor, measure, quantify, and/or sense other vehicles in the external environment of the vehicle 100 and/or information/data about such vehicles.

In accordance with one or more embodiments, the sensor system 180 may comprise one or more radar sensors 181. As set forth, described, and/or illustrated herein, "radar sensor" means any device, component and/or system that can detect, determine, assess, monitor, measure, quantify, and/or sense something using, at least in part, radio signals. The one or more radar sensors 181 may be configured to detect, determine, assess, monitor, measure, quantify, and/or sense, directly or indirectly, the presence of one or more vehicles in the external environment of the vehicle 100, the relative position of each detected vehicle relative to the vehicle 100, the spatial distance between each detected vehicle and the vehicle 100 in one or more directions (e.g., in a longitudinal direction, a lateral direction, and/or other direction(s)), the spatial distance between a detected vehicle and other detected vehicles in one or more directions (e.g., in a longitudinal direction, a lateral direction, and/or other direction(s)), the speed of each detected vehicle, and/or the movement of each detected vehicle.

In accordance with one or more embodiments, the sensor system 180 may comprise one or more lidar sensors 182. As set forth, described, and/or illustrated herein, "lidar sensor" means any device, component and/or system that can detect, determine, assess, monitor, measure, quantify, and/or sense something using at least in part lasers. Such devices may comprise a laser source and/or laser scanner configured to emit a laser and a detector configured to detect reflections of the laser. The one or more lidar sensors 182 may be configured to operate in a coherent or an incoherent detection mode. The one or more lidar sensors 182 may comprise high resolution lidar sensors.

The one or more lidar sensors 182 may be configured to detect, determine, assess, monitor, measure, quantify and/or sense, directly or indirectly, the presence of one or more vehicles in the external environment of the vehicle 100, the position of each detected vehicle relative to the vehicle 100, the spatial distance between each detected vehicle and the vehicle 100 in one or more directions (e.g., in a longitudinal direction, a lateral direction and/or other direction(s)), the elevation of each detected vehicle, the spatial distance between a detected vehicle and other detected vehicles in one or more directions (e.g., in a longitudinal direction, a lateral direction, and/or other direction(s)), the speed of each detected vehicle, and/or the movement of each detected vehicle. The one or more lidar sensors 182 may generate a three-dimensional (3D) representation (e.g., image) of each detected vehicle that may be used to compare to representations of known vehicles types via the one or more data store(s) 170. Alternatively or additionally, data acquired by the one or more lidar sensors 182 may be processed to determine such things.

In accordance with one or more embodiments, the sensor system 180 may comprise one or more image devices such as, for example, one or more cameras 186. As set forth, described, and/or illustrated herein, "camera" means any device, component, and/or system that can capture visual data. Such visual data may include one or more of video information/data and image information/data. The visual data may be in any suitable form. The one or more cameras 186 may comprise high resolution cameras. The high resolution can refer to the pixel resolution, the spatial resolution, spectral resolution, temporal resolution, and/or radiometric resolution.

In accordance with one or more embodiments, the one or more cameras 186 may comprise high dynamic range (HDR) cameras or infrared (IR) cameras.

In accordance with one or more embodiments, one or more of the cameras 186 may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. One or more of the cameras may be configured with zoom in and/or zoom out capabilities.

In accordance with one or more embodiments, one or more of the cameras 186 may be spatially oriented, positioned, configured, operable, and/or arranged to capture visual data from at least a portion of the external environment of the vehicle 100, and/or any suitable portion within the vehicle 100. For instance, one or more of the cameras may be located within the vehicle 100.

In accordance with one or more embodiments, one or more of the cameras 186 may be fixed in a position that does not change relative to the vehicle 100. Alternatively or additionally, one or more of the cameras 186 may be movable so that its position can change relative to the vehicle 100 in a manner which facilitates the capture of visual data from different portions of the external environment of the vehicle 100. Such movement of one or more of the cameras 186 may be achieved in any suitable manner, such as, for example, by rotation (about one or more rotational axes), by pivoting (about a pivot axis), by sliding (along an axis), and/or by extending (along an axis).

In accordance with one or more embodiments, the one or more cameras 186 (and/or the movement thereof) may be controlled by one or more of the processor 110, the sensor system 180, and any one or more of the modules set forth, described, and/or illustrated herein.

During operation of the vehicle 100, the processor(s) 110 may be configured to select one or more of the sensors 180 to sense the driving environment based on current given environmental conditions including, but not limited to the roadway, other vehicles, adjacent lanes, traffic rules, objects on the roadway, etc. For example, one or more lidar sensors 182 may be used to sense a driving environment when the vehicle 100 is operating in an autonomous mode during night time or evening time. As another example, a high-dynamic range (HDR) camera 186 may be used to sense the driving environment when the vehicle 100 is operating in an autonomous mode during daytime. The detection of vehicles when the vehicle 100 is operating in an autonomous mode may be performed in any suitable manner. For instance, a frame by frame analysis of the driving environment may be performed using a machine vision system using any suitable technique.

In accordance with one or more embodiments, the vehicle 100 may comprise a vehicle detection module 140. The vehicle detection module 140 may be implemented as computer readable program code that, when executed by a processor, implement one or more of the various processes set forth, described, and/or illustrated herein, including, for example, to detect one or more vehicles in the driving environment. The vehicle detection module 140 may be a component of the processor 110, or alternatively, may be executed on and/or distributed among other processing systems to which the processor 110 is operatively connected. The vehicle detection module 140 may include a set of logic instructions executable by the processor 110. Alternatively or additionally, the data store(s) 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The vehicle detection module 140 may be configured to detect one or more vehicles operating on the roadway in any suitable manner. The detection of one or more vehicles may be performed in any suitable manner. For instance, the detection may be performed using data acquired by the sensor system 180.

In accordance with one or more embodiments, should one or more vehicles vehicle be detected, the vehicle detection module 140 may also identify the detected vehicle(s). The vehicle detection module 140 can attempt to identify the dynamic vehicle by accessing vehicle data (e.g., vehicle images) located in a vehicle image database of the data store(s) 170 or an external source (e.g., cloud-based data store(s)).

In accordance with one or more embodiments, the vehicle detection module 140 may also include any suitable vehicle recognition software configured to analyze one or more images captured by the sensor system 180. The vehicle recognition software may query a vehicle image database for possible matches. For instance, images captured by the sensor system 180 may be compared to images located in the vehicle image database for possible matches. Alternatively or additionally, measurements or other aspects of an image captured by sensor system 180 may be compared to measurements or other aspects of images located in the vehicle image database.

The vehicle detection module 140 may identify the detected vehicle as a particular type of vehicle should there be one or more matches between the captured image(s) and an image located in the vehicle database. As set forth, described, and/or illustrated herein, a "match" or "matches" means that an image or other information collected by the sensor system 180 and one or more of the images located in the vehicle image database are substantially identical. For example, an image or other information collected by the sensor system 180 and one or more of the images in the vehicle image database may match within a predetermined threshold probability or confidence level.

In accordance with one or more embodiments, the vehicle 100 may comprise a vehicle tracking module 150. The vehicle tracking module 150 may be implemented as computer readable program code that, when executed by a processor, implements one or more of the various processes set forth, described, and/or illustrated herein, including, to one or more of follow, observe, watch, and track the movement of one or more vehicles over a plurality of sensor observations. As set forth, described, and/or illustrated herein, "sensor observation" means a moment of time or a period of time in which one or more sensors of a sensor system are used to acquire sensor data of at least a portion of a driving environment of a vehicle. The vehicle tracking module 150 may be a component of the processor 110, or alternatively, may be executed on and/or distributed among other processing systems to which the processor 110 is operatively connected. The vehicle tracking module 150 may comprise logic instructions executable by the processor 110. Alternatively or additionally, the data store(s) 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In accordance with one or more embodiments, the vehicle 100 may comprise a vehicle classification module 160. The vehicle classification module 160 may be implemented as computer readable program code that, when executed by a processor, implements one or more of the various processes set forth, described, and/or illustrated herein, including, for example, to classify a vehicle in a driving environment. The vehicle classification module 160 may be a component of the processor 110, or alternatively, may be executed on and/or distributed among other processing systems to which the processor 110 is operatively connected. The vehicle classification module 160 may comprise logic instructions executable by the processor 110. Alternatively or additionally, the data store(s) 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In accordance with one or more embodiments, the vehicle classification module 160 may be configured to detect, determine, assess, measure, quantify and/or sense, the vehicle type of one or more detected vehicle(s) in the driving environment based on vehicle size. The vehicle classification module 160 may be configured to classify the type of one or more detected vehicles according to one or more defined vehicle classifications. For example, the vehicle classification may comprise cars, vans, trucks, motorcycles, buses, trailers, and semi-trailers. Embodiments, however, are not limited thereto, and thus, the vehicle classification may comprise other forms of motorized transport.

The vehicle class of a detected vehicle may be determined in any suitable manner. For instance, a detected dimension of the vehicle (e.g., length, width, and/or height) may be compared to a predetermined dimension for each vehicle class (e.g., cars, vans, trucks, motorcycles, buses, trailers, and semi-trailers). The predetermined dimension may have any suitable value. The predetermined dimension may be one or more of a predetermined length, a predetermined width, and a predetermined height. In such arrangements, the relative size of a detected vehicle may be determined with respect to one or more of the predetermined length, the predetermined width, and the predetermined height. For example, one or more of the length, height, or width of a detected vehicle may be detected. The detected length, height, or width of the detected vehicle may be compared to a predetermined length height, or width. The predetermined length, height, or width may be any suitable length, height, or width. Should the detected dimension (e.g., length, height, or width) match a predetermined dimension within a predetermined threshold value, the vehicle type may then be classified. Such a comparison, and/or classification may be performed or executed by one or more of the processor 110 and the vehicle classification module 160.

Alternatively or additionally, the sensor system 180, the processor 110 and/or the vehicle classification module 160 may be configured to detect, determine, assess, measure, quantify and/or sense, directly or indirectly, the size of at least a portion of one or more vehicles in the driving environment.

In accordance with one or more embodiments, one or more of the modules 120, 130, 140, 150, 160, and 199 set forth, described, and/or illustrated herein may include artificial or computational intelligence elements, e.g., neural network, fuzzy logic, or other machine learning algorithms.

In accordance with one or more embodiments, one or more of the modules 120, 130, 140, 150, 160, and 199 set forth, described, and/or illustrated herein may be distributed among a plurality of the modules described herein. In accordance with one or more embodiments, two or more of the modules 120, 130, 140, 150, 160, and 199 may be combined into a single module.

In accordance with one or more embodiment, the vehicle 100 may comprise one or more vehicle systems 190, to include a propulsion system 191, a braking system 192, a steering system 193, a throttle system 194, a transmission system 195, a signaling system 196, and a navigation system 197. Embodiments, however, are not limited thereto, and thus, the vehicle 100 may comprise more, fewer or different systems.

The propulsion system 191 may comprise one or more mechanisms, devices, elements, components, systems, and/or combinations thereof (now known or later developed), configured to provide powered motion for the vehicle 100. The propulsion system 191 may comprise an engine and an energy source.

The braking system 192 may comprise one or more mechanisms, devices, elements, components, systems, and/ or combinations thereof (now known or later developed), configured to decelerate the vehicle 100.

The steering system 193 may comprise one or more mechanisms, devices, elements, components, systems, and/or combinations thereof (now known or later developed), configured to adjust the heading of the vehicle 100.

The throttle system 194 may comprise one or more mechanisms, devices, elements, components, systems, and/or combinations thereof (now known or later developed), configured to control the operating speed of an engine/motor of the vehicle 100 and, in turn, the speed of the vehicle 100.

The transmission system 195 may comprise one or more mechanisms, devices, elements, components, systems, and/or combinations thereof (now known or later developed), configured to transmit mechanical power from the engine/motor of the vehicle 100 to the wheels/tires.

The signaling system 196 may comprise one or more mechanisms, devices, elements, components, systems, and/or combinations thereof (now known or later developed), configured to provide illumination for the driver of the vehicle 100 and/or to provide information with respect to one or more aspects of the vehicle 100. For instance, the signaling system 196 may provide information regarding the vehicle's presence, position, size, direction of travel, and/or the driver's intentions regarding direction and speed of travel of the vehicle 100. For instance, the signaling system 196 may comprise headlights, taillights, brake lights, hazard lights and turn signal lights.

The navigation system 197 may comprise one or more mechanisms, devices, elements, components, systems, applications and/or combinations thereof (now known or later developed), configured to determine the geographic location of the vehicle 100 and/or to determine a travel route for the vehicle 100. The navigation system 197 may comprise one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.).

In accordance with one or more embodiments, the navigation system 197 may be configured to update the travel route dynamically while the vehicle 100 is in operation. The navigation system 197 may comprise one or more of a global positioning system, a local positioning system or a geolocation system. The navigation system 197 may be implemented with any one of a number of satellite positioning systems, such as the United States Global Positioning System (GPS), the Russian Glonass system, the European Galileo system, the Chinese Beidou system, the Chinese COMPASS system, the Indian Regional Navigational Satellite System, or any system that uses satellites from a combination of satellite systems, or any satellite system developed in the future. The navigation system 197 may use Transmission Control Protocol (TCP) and/or a Geographic information system (GIS) and location services.

The navigation system 197 may comprise a transceiver configured to estimate a position of the vehicle 100 with respect to the Earth. For example, navigation system 197 may comprise a GPS transceiver to determine the vehicle's latitude, longitude and/or altitude. The navigation system 197 may use other systems (e.g. laser-based localization systems, inertial-aided GPS, and/or camera-based localization) to determine the location of the vehicle 100. Alternatively or additionally, the navigation system 197 may be based on access point geolocation services, such as using the W3C Geolocation Application Programming Interface (API). With such a system, the location of the vehicle 100 may be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. It will be understood, therefore, that the specific manner in which the geographic position of the vehicle 100 is determined will depend on the manner of operation of the particular location tracking system used.

The processor(s) 110 and/or the autonomous driving module 120 may be operatively connected to communicate with the various vehicle systems 190 and/or individual components thereof. For example, the processor(s) 110 and/or the autonomous driving module 120 may be in communication to send and/or receive information from the various vehicle systems 190 to control the movement, speed, maneuvering, heading, direction, etc. of the vehicle 100. The processor(s) 110 and/or the autonomous driving module 120 may control some or all of the vehicle systems 190 and, thus, may be partially or fully autonomous.

The processor 110 and/or the autonomous driving module 120 may be configured to control the navigation and/or maneuvering of the vehicle 100 by controlling one or more of the vehicle systems 190 and/or components thereof. For example, when operating in an autonomous mode, the processor 110 and/or the autonomous driving module 120 may control the direction and/or speed of the vehicle 100. The processor(s) 110 and/or the autonomous driving module 120 may cause the vehicle 100 to accelerate (e.g., by increasing the supply of fuel provided to the engine), decelerate (e.g., by decreasing the supply of fuel to the engine and/or by applying brakes) and/or change direction (e.g., by turning the wheels).

The vehicle 100 may comprise one or more actuators 198. The actuators 198 may be any element or combination of elements configured to modify, adjust and/or alter one or more of the vehicle systems 190 or components thereof to responsive to receiving signals or other inputs from the processor 110 and/or the autonomous driving module 120. Any suitable actuator may be used. For instance, the one or more actuators 198 may comprise motors, pneumatic actuators, hydraulic pistons, relays, solenoids, and/or piezoelectric actuators, etc.

In accordance with one or more embodiments, the vehicle 100 may comprise machine learning (ML) system 199. As set forth, described, or illustrated herein, machine learning means computers and/or systems having an ability to learn without being explicitly programmed. Machine learning algorithms may be used to train one or more machine learning models of the vehicle 100 based on the data that is received via one or more of the processors 110, the data store(s) 170, the sensor system 180, the vehicle system, 190, and any other input sources. The ML algorithms may include one or more of a linear regression algorithm, a logical regression algorithm, or a combination of different algorithms. A neural network may also be used to train the system based on the received data. The ML system 199 may analyze the received information or data related to the driving environment in order to enhance one or more of the autonomous driving module(s) 120, the vehicle detection module 140, the vehicle tracking module 150, the vehicle classification module 160, the sensor system(s) 180, and the vehicle systems 190.

In accordance with one or more embodiments, the ML system 199 may also receive information from one or more other vehicles and process the received information to dynamically determine patterns in the detected driving environment. Information may be received based on preferences including location (e.g., as defined by geography from address, zip code, or GPS coordinates), planned travel routes (e.g., GPS alerts), activity associated with co-owned/shared vehicles, history, news feeds, and the like. The information (i.e., received or processed information) may also be uplinked to other systems and modules in the vehicle 100 for further processing to discover additional information that may be used to enhance the understanding of the information. The ML system 199 may also send information to other vehicles in the detected driving environment, and link to other devices, including but not limited to smart phones, smart home systems, or Internet-of-Things (IoT) devices. The ML system 199 may thereby communicate with/to other vehicles of an intention to change lanes to a particular lane, thereby enhancing safety by reducing the likelihood a vehicle collision when implementing a driving maneuver.

In accordance with one or more embodiments, the ML system 199 may comprise one or more processors, and one or more data stores (e.g., non-volatile memory/NVM and/or volatile memory) containing a set of instructions, which when executed by the one or more processors, cause the ML system 199 to receive information from one or more of other vehicles, the processor(s) 110, the data store(s) 170, the sensor system 180, the vehicle system, 190, and any other input/output sources, and process the received information to, inter alia, identify a lane change area and cause implementation of a driving maneuver to the identified lane change area. Embodiments, however, are not limited thereto, and thus, the ML system 199 may process the received information to do other aspects related to operation of the vehicle 100. The ML system 199 may communicate with and collect information from one or more of other vehicles, the processor(s) 110, the data store(s) 170, the sensor system 180, the vehicle system, 190, and any other input/output sources to provide a deeper understanding of the monitored activities of the systems, components, and interfaces.

In accordance with one or more embodiments, the ML system 199 may utilize the capabilities of a monitoring as a service (MaaS) interface (not illustrated) to facilitate the deployment of monitoring functionalities in a cloud environment. The MaaS interface would thereby facilitate tracking by the ML system 199 of the states of systems, subsystems, components, and associated applications, networks, and the like within the cloud. The one or more other vehicles from which the machine learning subsystem receives information may include, for example, vehicles in the detected driving environment, vehicles in a user-defined area (e.g., addresses, neighborhoods, zip codes, cities, etc.), vehicles that are owned or shared by the user, vehicles along an upcoming or expected travel route (e.g., based on GPS coordinates), and the like. The received information may allow a user and a remote operator of the vehicle 100 to better monitor and recognize patterns and changes in the detected driving environment.

In accordance with one or more embodiments, the causing of a driving maneuver by the vehicle 100 to be implemented may be performed automatically (e.g., via the processor(s) and/or modules), or manually by a vehicle occupant (e.g. a driver and/or other passenger) or a remote operator of the vehicle 100. In one or more arrangements, a vehicle occupant or a remote operator may be prompted to provide permission to implement the driving maneuver. The vehicle occupant or the remote operator can be prompted by one or more sources: visually, aurally, and haptically. For example, a vehicle occupant or a remote operator may be prompted via a user interface located within a passenger compartment of the vehicle 100, or a user interface located external to the vehicle 100. Alternatively or additionally, a vehicle occupant or a remote operator may be prompted via audial output over one or more audial channels. Embodiments, however, are not limited thereto, and thus, the vehicle 100 may employ other forms of prompting as an alternative or in addition to visual, audio, and haptic prompting.

Responsive to receiving an input corresponding to approval by the vehicle occupant or the remote operator to implement the driving maneuver, the vehicle 100 may be caused to implement the driving maneuver. In accordance with one or more embodiments, the driving maneuver may be implemented only upon a determination that it may be executed safely in view of the current driving environment, including, but not limited to the roadway, other vehicles, adjacent lanes, traffic rules, objects on the roadway, etc.

FIGS. 2A to 2D respectively illustrate non-limiting examples of an operation of the vehicle 100 in accordance with one or more embodiments. The vehicle 100 may be traveling in a driving environment that comprises a roadway. As set forth, described, and/or illustrated herein, "roadway" means a thoroughfare, route, path, or way between two places and upon which one or more vehicles may travel. The roadway comprises a plurality of lanes that include a first lane 202, a second lane 204, and a third lane 206. As set forth, described, and/or illustrated herein, a "lane" is a portion of a roadway that is designated for use by a single line of vehicles and/or a portion of a roadway that is being used by a single line of vehicles. Although the illustrated example shows a roadway comprising three lanes, embodiments are not limited thereto, and thus, the roadway may comprise any number of lanes.

Figure 2A:
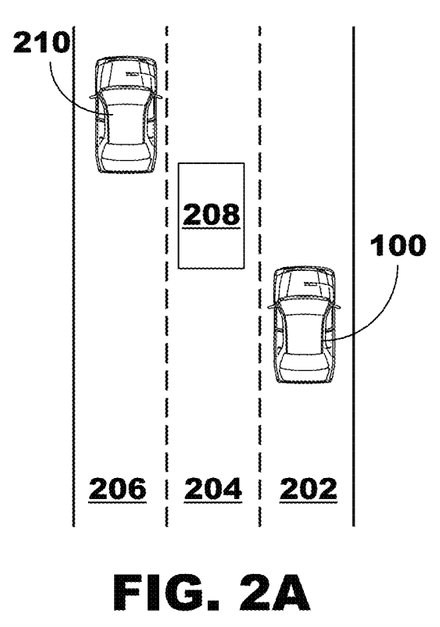
FIGS. 2A to 2D illustrate examples of an operation of the autonomous vehicle of FIG. 1.

In the illustrated examples, the first lane 202 may be a lane in which the vehicle 100 travels in a first direction. The second lane 204 may presently be an unoccupied lane immediately laterally adjacent to the first lane 202. The third lane 206 may be a lane in which one or more vehicles, such as, for example, a second vehicle 210 and a third vehicle 212 travels in the first direction, and which is immediately laterally adjacent to the second lane 204. The first lane 202, the second lane 204, and the third lane 206 may be substantially parallel to each other along at least a portion of their respective lengths. As illustrated in FIG. 2D, the roadway alignment may include a first roadway section 214 that is substantially straight, a second roadway section 216 that is curved, and a third roadway section 218 that is substantially straight.

In the illustrated examples, the vehicle 100 may identify a target lane change area 208 of the second lane. The vehicle 100 may detect, via the sensor system 180, the driving environment. The driving environment may include the presence of a vehicle traveling the second lane 204 and a vehicle traveling in the third lane 206 immediately adjacent to the targeted area 208 of the second lane 204.

The vehicle 100 may determine the location of the detected vehicle 210 relative to the identified target lane change area 208. As illustrated in FIG. 2A, should the vehicle 100 determine that the detected vehicle 210 is not within a predetermined threshold distance to the identified target lane change area 208, the vehicle 100 may execute or be caused to execute a driving maneuver by which the vehicle 100 is to change from the first lane 202 to the identified target lane change area 208.

Figure 2B:
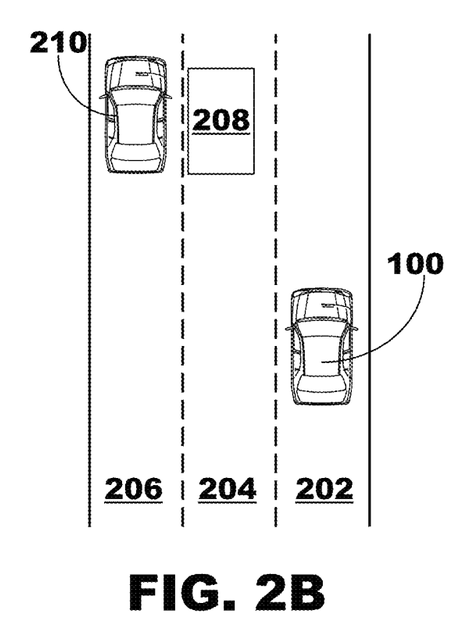

As illustrated in FIG. 2B, should, on the other hand, the vehicle 100 determine that the detected vehicle 210 is within a predetermined threshold distance to the identified target lane change area 208, the vehicle 100 may classify, via the vehicle classification module 160, the vehicle type of the second vehicle 210. The vehicle 100 may then compare the classified vehicle type of the second vehicle 210 to an acceptable vehicle type. Via a user interface located at the I/O Hub 130 or at a location external to the vehicle 100, the acceptable vehicle type may be predetermined and selectable by a user or a remote operator of the vehicle 100. For example, the user or remote operator may be averse to changing into an area of an adjacent lane that itself is adjacent to a particularly class of vehicle (e.g., a semi-truck). In such an instance, the user or remote operator may indicate, via the user interface, that an acceptable vehicle class would be all vehicles except semi-trucks.

Alternatively or additionally, the vehicle 100 may dynamically track, via the vehicle tracking module 150, the movement of the detected second vehicle 210 and delay execution or of a driving maneuver to change from the first lane 202 to the identified target lane change area 208 upon a determination that the detected vehicle 210 is not within the predetermined threshold distance. For example, should the second vehicle 210 be classified as a semi-truck, implementation of a driving maneuver to the identified target lane change area 208 is delayed until a safe lane change (either to the lane change area 208 or another identified lane change area) may take place.

Figure 2C:
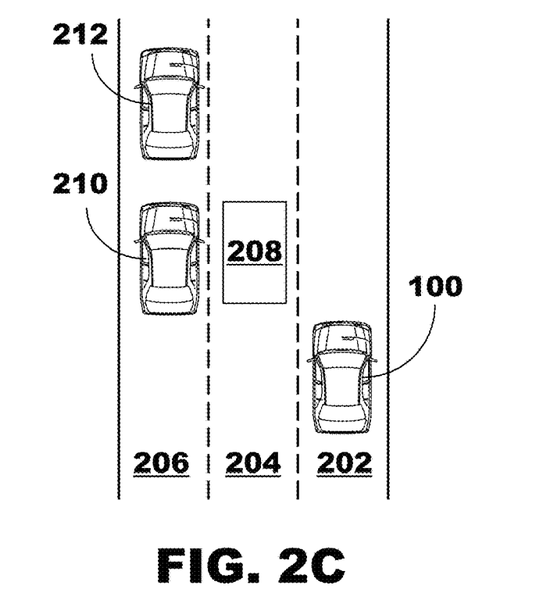
Figure 2D:
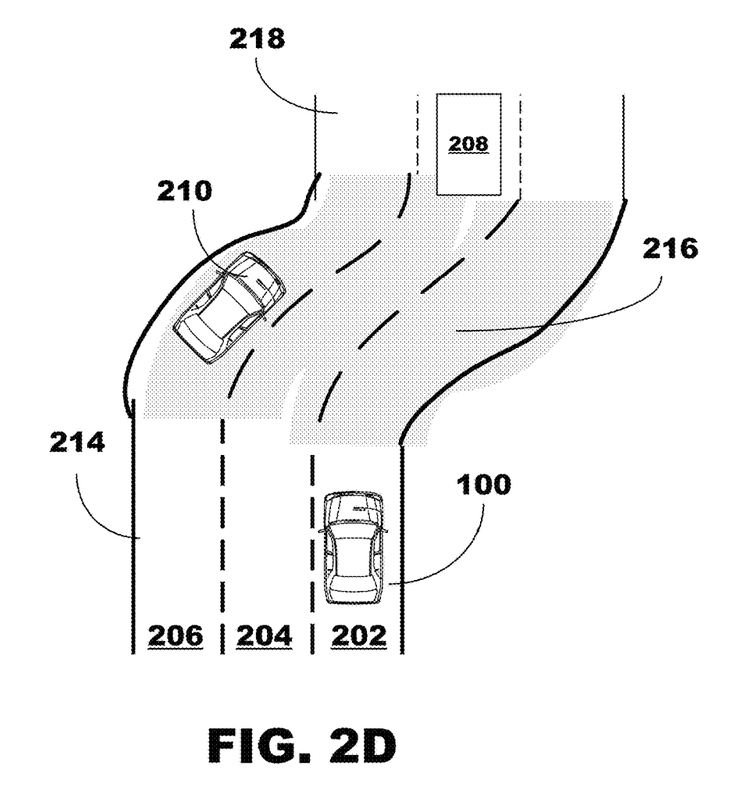

As illustrated in FIGS. 2C and 2D, alternatively or additionally, the driving environment may include the presence of a third vehicle 212 traveling in the third lane 206 that is spatially ahead of the detected second vehicle 210. Alternatively or additionally, the driving environment may include the geometric roadway design at least up to a distance where a lane change may be completed. Alternatively or additionally, the vehicle 100 may dynamically track, via the vehicle tracking module 150, the movement of the detected second vehicle 210 and the detected third vehicle 212.

The vehicle 100 may prevent a lane change due to a change in roadway alignment (e.g., from a straight alignment to a curved alignment, or the roadway changing from three lanes to two lanes) or in circumstances where it is determined to be likely that the second vehicle 210 may suddenly change lanes due to one or more of the spatial distance between the second vehicle 210 and the third vehicle 212, and the relative speeds between the second vehicle 210 and the third vehicle 212.

The vehicle 100 may prevent a lane change due to a change in roadway alignment (e.g., from a straight alignment to a curved alignment, or the roadway changing from three lanes to two lanes) or in circumstances where it is determined predicted to be likely that the second vehicle 210 may change lanes due to one or more of factors, including but not limited to, the spatial distance between the second vehicle 210 and the third vehicle 212, the relative speeds between the second vehicle 210 and the third vehicle 212, and the detected geometric roadway design.

In accordance with one or more embodiments, the vehicle 100 may identify a target lane change area 208 of the second lane 204. Alternatively or additionally, the vehicle 100 may dynamically track the movement of the detected second vehicle 210 and the detected third vehicle 212. Alternatively or additionally, the vehicle 100 may determine the location of at least the detected second vehicle 210 relative to the identified target lane change area 208. Alternatively or additionally, the vehicle 100 may determine, via one or more of the processor 110, the vehicle tracking module 150, and the sensor system 180, one or more of a spatial distance between the detected second vehicle and the detected third vehicle, and a rate of speed/acceleration of the detected second vehicle. Alternatively or additionally, the vehicle 100 may determine or predict, responsive to the detected geometric roadway design, the determination of the spatial distance, and the determination of the rate of the speed/acceleration of the detected second vehicle 210, the probability of the detected second vehicle 210 implementing a lane change to the second lane 204.

The vehicle 100 may then execute or be caused to execute, in response to the determination or prediction that is less than probable (in view of a predetermined threshold probability value) the detected second vehicle 210 implementing a lane change to the second lane 204, implementation of a driving maneuver by which the vehicle 100 is to change from the first lane 202 to the identified target lane change area 208.

The vehicle 100 may, responsive to the determination or prediction that is more than probable (in view of a predetermined threshold probability value) the detected second vehicle 210 implementing a lane change to the second lane 204, delay implementation of the driving maneuver at least until a lane change may be safely executed. Alternatively or additionally, the vehicle 100 may identify a new or alternative target lane change area.

Figure 3:
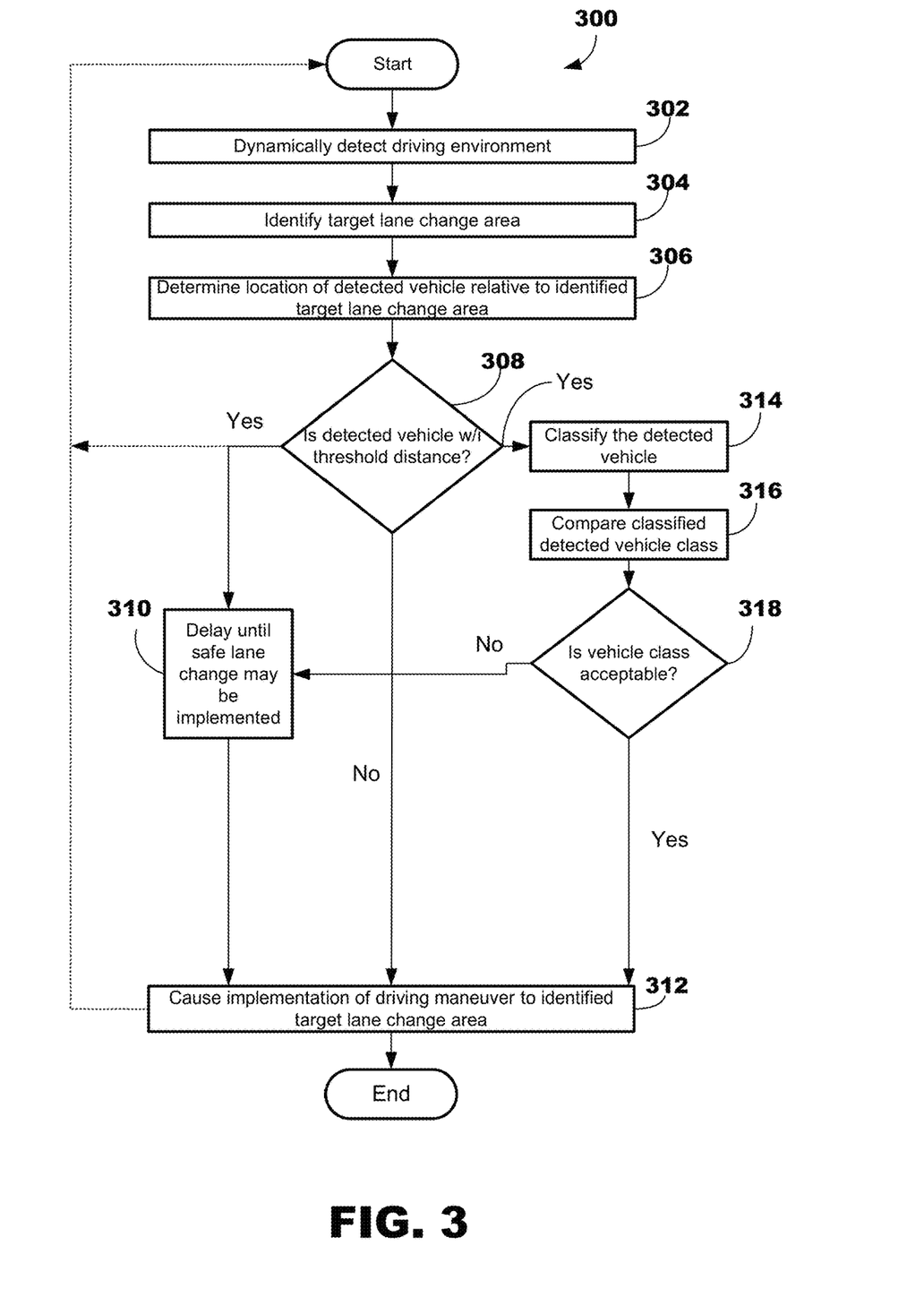
FIGS. 3 to 5 illustrate flowcharts of an example of a method of operating the autonomous vehicle in accordance with FIG. 1.
Figure 4:
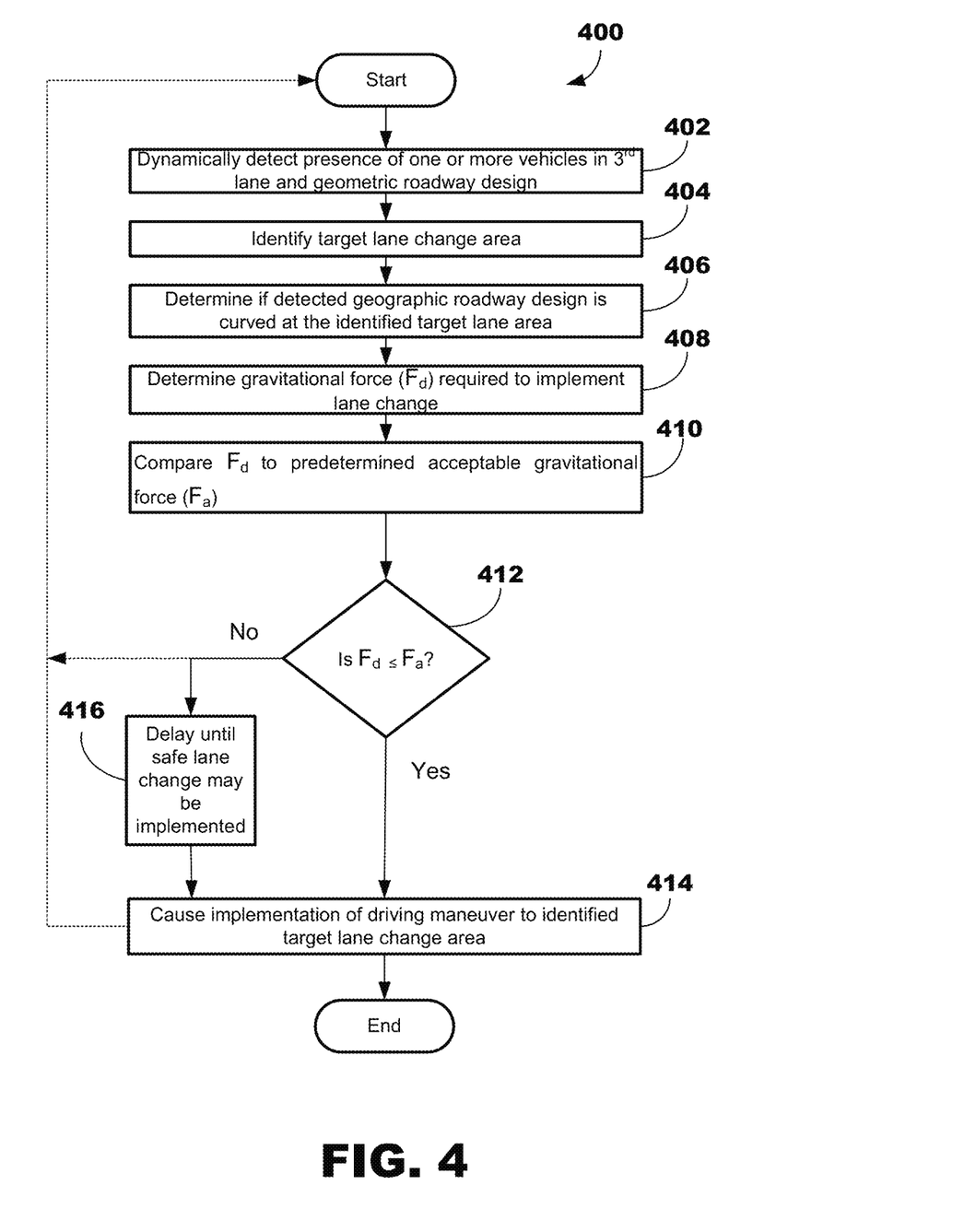
Figure 5:
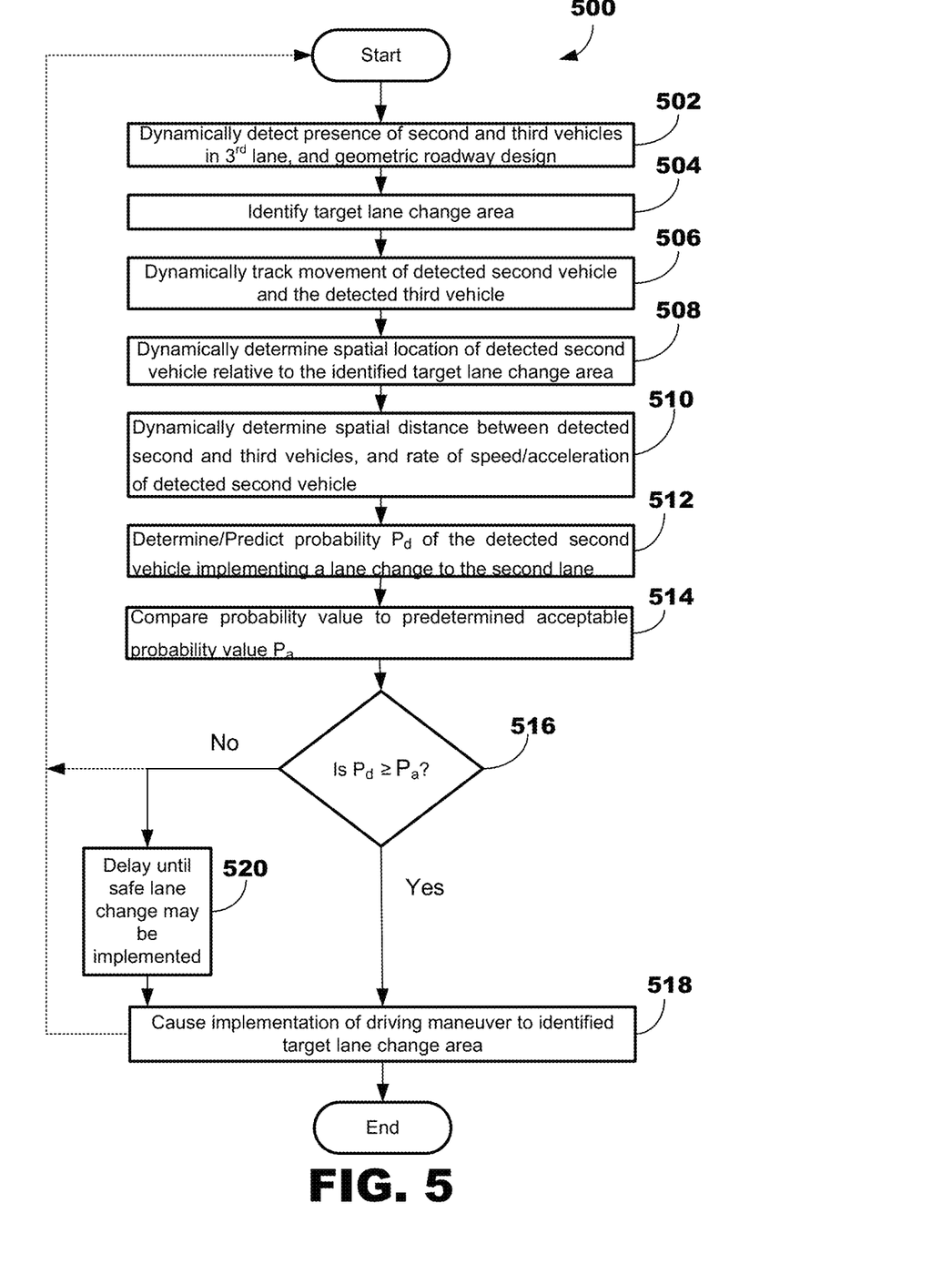

Illustrated examples shown in FIGS. 3 to 5 set forth methods 300, 400, and 500 for operating a vehicle, when operating at least partially in an autonomous mode, to change from a first lane to a second lane adjacent to the first lane. The methods 300, 400, and 500 may be implemented, for example, in logic instructions (e.g., software), configurable logic, fixed-functionality hardware logic, etc., or any combination thereof.

As illustrated in FIG. 3, illustrated process block 302 includes dynamically detecting detect a driving environment located externally to the autonomous vehicle which includes a presence of one or more vehicles in a third lane adjacent to the second lane. In accordance with one or more embodiments, execution of process block 302 may be performed by one or more of the processor 110, the vehicle detection module 140, the vehicle tracking module 150, and the sensor system 180. At least a portion of an external environment of the vehicle 100 may be dynamically sensed to detect such vehicles. For example, the vehicle 100 may sense or detect the external driving environment in one or more directions, such as: a lateral direction relative to the longitudinal axis of the vehicle 100, an aft direction relative to the longitudinal axis of the vehicle 100, and a fore direction relative to the longitudinal axis of the vehicle 100.

The method 300 may then proceed to illustrated process block 304, which includes identifying a target lane change area in the second lane. In accordance with one or more embodiments, execution of process block 304 may be performed by one or more of the processor 110 and the sensor system 180.

The method 300 may then proceed to illustrated process block 306, which includes determining the location of the detected vehicle relative to the identified target lane change area. In accordance with one or more embodiments, execution of process block 306 may be performed by one or more of the processor 110, the vehicle tracking module 150, and the sensor system 180.

The method 300 may then proceed to illustrated process block 308, which includes a determination of whether the detected vehicle is within an acceptable threshold distance relative of the identified target lane change area. If "No," process block 312 includes causing, responsive to a determination that the detected vehicle is not within an acceptable threshold distance relative to the identified target lane change area, implementation of a driving maneuver by the autonomous vehicle from the first lane to the identified target lane change area. In accordance with one or more embodiments, execution of process block 312 may be performed by one or more of the processor 110 and the autonomous driving module 120.

If "Yes," process block 310 includes delaying the lane change to the target lane until a lane change may be safely executed, and then proceed to process block 312.

Alternatively or additionally, if "Yes," the method 300 may then proceed to start whereby a new or alternative target lane change area is identified.

Alternatively or additionally, if "Yes," process block 314 includes classifying the detected vehicle(s) based on vehicle type. In accordance with one or more embodiments, execution of process block 314 may be performed by one or more of the processor 110 and the vehicle classification module 160.

The method 300 may then proceed to illustrated process block 316, which includes comparing the classified detected vehicle type to an acceptable vehicle type. In accordance with one or more embodiments, execution of processing block 316 may be performed by one or more of the processor 110 and the vehicle classification module 160.

The method 300 may then proceed to illustrated block 318, which includes a determination of whether the classified detected vehicle type is an acceptable vehicle class. If "Yes," the method proceeds to process block 312. If "No," the method 300 may then proceed to process block 310.

The method 300 may terminate or end when the vehicle 100 is caused to execute or implement the driving maneuver of changing from the first lane to the target lane area. Alternatively, the method 300 may return to start or block 302. In accordance with one or more embodiments, one or more of the processor 110 and the autonomous driving module 120 may cause the vehicle 100 to implement the driving maneuver to change to the targeted lane. In this regard, one or more of the processor 110 and the autonomous driving module 120 may be operatively connected to one or more of the vehicle systems 190 to cause the driving maneuver to be implemented. Alternatively or additionally, one or more of the processor 110 and the autonomous driving module 120 may be operatively connected to and control the one or more actuators 198, which may control one or more of the vehicle systems 190 or portions thereof to implement the driving maneuver.

In accordance with one or more embodiments, the method may include additional process blocks (not illustrated). For example, following the execution of process block 302 and before the execution of process block 314, the method 300 may include a process block that includes dynamically tracking a movement of the detected vehicle(s). Such tracking of the detected vehicle(s) may occur over a plurality of sensor detection moments or frames. In accordance with one or more embodiments, execution of the detected vehicle tracking process block may be performed by one or more of the processor 110 and the vehicle tracking module 150.

As illustrated in FIG. 4, illustrated process block 402 includes dynamically detecting a driving environment, located externally to the autonomous vehicle, which includes a presence of one or more vehicles in the third lane adjacent to the second lane, and a geometric roadway design at least up to a distance where the lane change may be completed. In accordance with one or more embodiments, execution of process block 402 may be performed by one or more of the processor 110, the vehicle detection module 140, the vehicle tracking module 150, the sensor system 180, and the navigation system 197. At least a portion of an external environment of the vehicle 100 may be dynamically sensed to detect such vehicles. For example, the vehicle 100 may sense or detect the external driving environment in one or more directions, such as: a lateral direction relative to the longitudinal axis of the vehicle 100, an aft direction relative to the longitudinal axis of the vehicle 100, and a fore direction relative to the longitudinal axis of the vehicle 100.

The method 400 may then proceed to illustrated process block 404, which includes identifying a target lane change area in the second lane. In accordance with one or more embodiments, execution of process block 404 may be performed by one or more of the processor 110 and the sensor system 180.

The method 400 may then proceed to illustrated process block 406, which includes determining, based on the detected geometric roadway design, if the detected geometric roadway design at the identified target lane change area is curved. In accordance with one or more embodiments, execution of process block 406 may be performed by one or more of the processor 110, the sensor system 180, and the navigation system 197.

The method 400 may then proceed to illustrated process block 408, which includes determining, responsive to a determination that the detected geometric roadway design at the identified target lane change area is curved, the gravitational force ($F_d$) required to implement a lane change to the identified target lane change area. In accordance with one or more embodiments, execution of process block 408 may be performed by the processor 110.

The method 400 may then proceed to illustrated process block 410, which includes comparing the determined gravitational force ($F_d$) to a predetermined acceptable or threshold gravitational force value ($F_a$). In accordance with one or more embodiments, execution of process block 410 may be performed by one or more of the processor 110 and the autonomous driving module 120.

The method 400 may then proceed to illustrated process block 412, which includes a determination of whether the determined gravitational force ($F_d$) is less than or equal to the predetermined acceptable or threshold gravitational force value ($F_a$). In accordance with one or more embodiments, execution of process block 412 may be performed by one or more of the processor 110 and the autonomous driving module 120.

If "Yes," the method 400 proceeds to process block 414, which includes implementing a driving maneuver by the autonomous vehicle from the first lane to the identified target lane area. In accordance with one or more embodiments, execution of process block 414 may be performed by one or more of the processor 110 and the autonomous driving module 120.

If "No," the method 400 proceeds to process block 416, which includes delaying the implementation of a driving maneuver by the autonomous vehicle at least until a lane change may be implemented. Alternatively or additionally, should the determined gravitational force ($F_d$) be greater than the predetermined acceptable or threshold gravitational force value ($F_a$), the process returns to start whereby a new or alternative target lane change area may be identified. In accordance with one or more embodiments, execution of process block 416 may be performed by one or more of the processor 110 and the autonomous driving module 120.

As illustrated in FIG. 5, illustrated process block 502 includes dynamically detecting a driving environment, located externally to the autonomous vehicle, which may include one or more of a presence of a second vehicle and a third vehicle in a third lane adjacent to a second lane, and a geometric roadway design at least up to a distance where the lane change may be completed. In accordance with one or more embodiments, execution of process block 502 may be performed by one or more of the processor 110, the vehicle detection module 140, the vehicle tracking module 150, the sensor system 180, and the navigation system 197. At least a portion of an external environment of the vehicle 100 may be dynamically sensed to detect such vehicles. For example, the vehicle 100 may sense or detect the external driving environment in one or more directions, such as: a lateral direction relative to the longitudinal axis of the vehicle 100, an aft direction relative to the longitudinal axis of the vehicle 100, and a fore direction relative to the longitudinal axis of the vehicle 100

The method 500 may then proceed to illustrated process block 504, which includes identifying a target lane change area in the second lane. In accordance with one or more embodiments, execution of process block 504 may be performed by one or more of the processor 110 and the sensor system 180.

The method 500 may then proceed to illustrated process block 506, which includes dynamically tracking the movement of the detected second vehicle 210 and the detected third vehicle 212. In accordance with one or more embodiments, execution of process block 506 may be performed by one or more of the processor 110, the sensor system 180, and the vehicle tracking module 150.

The method 500 may then proceed to illustrated process block 508, which includes dynamically determining the spatial location of at least the detected second vehicle 210 relative to the identified target lane change area 208. In accordance with one or more embodiments, execution of process block 508 may be performed by one or more of the processor 110, the vehicle detection module 140, the vehicle tracking module 150, and the sensor system 180.

The method 500 may then proceed to illustrated process block 510, which includes dynamically determining one or more of a spatial distance between the detected second vehicle 210 and the detected third vehicle 212, and a rate of speed/acceleration of the detected second vehicle 210. In accordance with one or more embodiments, execution of process block 510 may be performed by one or more of the processor 110, the vehicle tracking module 150, and the sensor system 180.

The method 500 may then proceed to illustrated process block 512, which includes determining or predicting, responsive to one or more of the detected geometric roadway design, the determined spatial distance, and the determined rate of the speed/acceleration of the detected second vehicle 210, the probability ($P_d$) of the detected second vehicle 210 implementing a lane change to the second lane.

The method 500 may then proceed to illustrated process block 514, which includes comparing the determined probability ($P_d$) to a predetermined acceptable or threshold probability ($P_a$). In accordance with one or more embodiments, execution of process block 514 may be performed by one or more of the processor 110 and the autonomous driving module 120.

The method 500 may then proceed to illustrated process block 516, which includes a determination of whether the determined probability ($P_d$) is greater than or equal to the predetermined acceptable or threshold probability ($P_a$). In accordance with one or more embodiments, execution of process block 516 may be performed by one or more of the processor 110 and the autonomous driving module 120.

If "Yes," the method 500 proceeds to process block 518, which includes implementing a driving maneuver by the autonomous vehicle from the first lane to the identified target lane area. In accordance with one or more embodiments, execution of process block 518 may be performed by one or more of the processor 110 and the autonomous driving module 120.

If "No," the method 500 proceeds to process block 520, which includes delaying the implementation of a driving maneuver by the autonomous vehicle at least until a lane change may be implemented. Alternatively or additionally, the method 500 may return to "Start" whereby a new or alternative target lane change area may be identified. In accordance with one or more embodiments, execution of process block 520 may be performed by one or more of the processor 110 and the autonomous driving module 120.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A system for operating a vehicle, when operating at least partially in an autonomous mode, to change from a first lane to a second lane adjacent to the first lane, the system comprising:

a sensor system to dynamically detect a driving environment located externally to the autonomous vehicle which includes a presence of a vehicle in a third lane adjacent to the second lane; and one or more processors, operatively coupled to the sensor system, to execute a set of instructions that cause the one or more processors to:

identify a target lane change area in the second lane;

determine the location of the detected vehicle relative to the identified target lane change area;

cause, responsive to a determination that the detected vehicle is not within a predetermined threshold distance relative of the identified target lane change area, implementation of a driving maneuver by the autonomous vehicle from the first lane to the identified target lane change area; and classify, responsive to a determination that the detected vehicle is within the predetermined threshold distance to the identified target lane change area, the detected vehicle based on vehicle type, wherein classifying the detected vehicle includes comparing the detected vehicle type to a predetermined acceptable vehicle type.

2. The system of claim 1, wherein the set of instructions cause the one or more processors to delay, responsive to a determination that the detected vehicle is within the predetermined threshold distance to the identified target lane change area, implementation of the lane change by the autonomous vehicle until the detected vehicle is not within the predetermined threshold distance to the identified target lane change area.

3. The system of claim 1, wherein the set of instructions cause the one or more processors to cause, responsive to determination that the vehicle type is acceptable based on the comparison, implementation of a driving maneuver by the autonomous vehicle from the first lane to the target lane area.

4. The system of claim 1, wherein detecting the driving environment comprises detecting a geometric roadway design at least up to a distance where a lane change may be completed.

5. The system of claim 1, wherein detecting the driving environment comprises detecting a presence of a second vehicle in the third lane that is spatially ahead of the detected vehicle.

6. A method of operating a vehicle, when operating at least partially in an autonomous mode, to change from a first lane to a second lane adjacent to the first lane, the method comprising:
dynamically detecting a driving environment, located externally to the autonomous vehicle, which includes a presence of a vehicle in a third lane adjacent to the second lane;
identifying a target lane change area in the second lane;
determining the location of the detected vehicle relative to the identified target lane change area;
causing, responsive to a determination that the detected vehicle is not within a predetermined threshold distance relative of the identified target lane change area, implementation of a driving maneuver by the autonomous vehicle from the first lane to the identified target lane change area; and
classifying, responsive to a determination that the detected vehicle is within the predetermined threshold distance to the identified target lane change area, the detected vehicle based on vehicle type, wherein classifying the detected vehicle includes comparing the detected vehicle type to a predetermined acceptable vehicle type.

7. The method of claim 6, further comprising delaying, responsive to a determination that the detected vehicle is within the predetermined threshold distance to the identified target lane change area, implementation of the lane change by the autonomous vehicle until the detected vehicle is not within the predetermined threshold distance to the identified target lane change area.

8. The method of claim 6, further comprising causing, responsive to determination that the vehicle type is acceptable based on the comparison, implementation of a driving maneuver by the autonomous vehicle from the first lane to the targeted lane.

9. The method of claim 6, wherein detecting the driving environment comprises detecting a geometric roadway design at least up to a distance where a lane change may be completed.

10. The method of claim 6, wherein detecting the driving environment comprises detecting a presence of a second vehicle in the third lane that is spatially ahead of the detected vehicle.

11. A computer program product for operating a vehicle, when operating at least partially in an autonomous mode, to change from a first lane to a second lane adjacent to the first lane, the computer program product including at least one non-transitory computer readable medium, comprising a set of instructions, which when executed by one or more processors, cause the one or more processors to:
identify a target lane change area in the second lane;
determine the location of a detected vehicle relative to the identified target lane change area;
cause, responsive to a determination that the detected vehicle is not within a predetermined threshold distance relative of the identified target lane change area, implementation of a driving maneuver by the autonomous vehicle from the first lane to the identified target lane change area; and
classify, responsive to a determination that the detected vehicle is within the predetermined threshold distance to the identified target lane change area, the detected vehicle based on vehicle type, wherein classifying the detected vehicle includes comparing the detected vehicle type to a predetermined acceptable vehicle type.

12. The computer program product of claim 11, wherein the set of instructions cause the one or more processors to delay, responsive to a determination that the detected vehicle is within the predetermined threshold distance to the identified target lane change area, implementation of the lane change by the autonomous vehicle until the detected vehicle is not within the predetermined threshold distance to the identified target lane change area.

13. The computer program product of claim 11, wherein the set of instructions cause the one or more processors to cause, responsive to determination that the vehicle type is acceptable based on the comparison, implementation of a driving maneuver by the autonomous vehicle from the first lane to the target lane area.

14. The computer program product of claim 11, wherein detecting the driving environment comprises detecting a geometric roadway design at least up to a distance where a lane change may be completed.

* * * * *